US009549375B2

(12) United States Patent
Dooley et al.

(10) Patent No.: US 9,549,375 B2
(45) Date of Patent: Jan. 17, 2017

(54) OPERATING-MODE TRANSITIONS BASED ON ADVERTISING INFORMATION

(71) Applicant: Apple Inc., Cupertino, CA (US)

(72) Inventors: Craig P. Dooley, Los Gatos, CA (US); Akshay Mangalam Srivatsa, Sunnyvale, CA (US); Anjali S. Sandesara, Sunnyvale, CA (US); Michael J. Giles, San Jose, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 14/475,329

(22) Filed: Sep. 2, 2014

(65) Prior Publication Data

US 2015/0351038 A1 Dec. 3, 2015

Related U.S. Application Data

(60) Provisional application No. 62/005,755, filed on May 30, 2014.

(51) Int. Cl.
*H04B 7/00* (2006.01)
*H04W 52/02* (2009.01)
(Continued)

(52) U.S. Cl.
CPC ..... *H04W 52/0261* (2013.01); *G06Q 30/0267* (2013.01); *H04L 12/189* (2013.01);
(Continued)

(58) Field of Classification Search
CPC ..... H04W 84/18; H04W 88/06; H04M 1/7253
(Continued)

(56) References Cited

U.S. PATENT DOCUMENTS 8,473,577 B2   6/2013   Chan
8,583,090 B2   11/2013   Vartiainen et al.
(Continued)

FOREIGN PATENT DOCUMENTS

WO   WO2005/109829 A1   11/2005
WO   WO2015/183403 A1   11/2005
WO   WO2015/183414 A1   12/2015

*Primary Examiner* — April G Gonzales
(74) *Attorney, Agent, or Firm* — Sterne, Kessler, Goldstein and Fox P.L.L.C.

(57) ABSTRACT

In order to reduce the power consumption of a receiving electronic device, received advertising beacons may be filtered so that the receiving electronic device selectively transitions from a power-saving mode to a normal operating mode. For example, the receiving electronic device may receive a beacon with advertising information for a transmitting electronic device. If the advertising information is changed relative to a previous version of the advertising information for the transmitting electronic device, the receiving electronic device may transition from the power-saving mode to the normal operating mode. In this way, the receiving electronic device may 'wake up' if it receives an advertisement that it wants to act on, such as advertisements for: file sharing, wireless streaming of information, proximity pairing and/or continuity of a user experience with an application when the user transitions from the transmitting electronic device to the receiving electronic device.

20 Claims, 5 Drawing Sheets

(51) Int. Cl.
  *H04W 4/00* (2009.01)
  *H04L 12/18* (2006.01)
  *H04W 76/02* (2009.01)
  *G06Q 30/02* (2012.01)

(52) U.S. Cl.
  CPC ......... *H04W 4/008* (2013.01); *H04W 76/023* (2013.01); *Y02B 60/50* (2013.01)

(58) Field of Classification Search
  USPC ........................................................ 455/41.2
  See application file for complete search history.

(56) References Cited

U.S. PATENT DOCUMENTS

| | | | |
|---|---|---|---|
| 8,751,451 B2 | 6/2014 | Uola et al. | |
| 8,775,850 B2 | 7/2014 | Moy | |
| 8,850,052 B2 | 9/2014 | Rosenblatt | |
| 8,966,547 B2 | 2/2015 | Kim et al. | |
| 8,990,273 B2 | 3/2015 | Iarocci et al. | |
| 9,148,842 B2* | 9/2015 | Qi | H04W 48/10 |
| 9,270,708 B2 | 2/2016 | Dave et al. | |
| 2003/0110382 A1 | 6/2003 | Leporini | |
| 2003/0112789 A1 | 6/2003 | Heinonen | |
| 2004/0009748 A1 | 1/2004 | Heinonen et al. | |
| 2008/0171561 A1 | 7/2008 | Irony et al. | |
| 2008/0280684 A1 | 11/2008 | McBride et al. | |
| 2010/0082784 A1 | 4/2010 | Rosenblatt et al. | |
| 2011/0225640 A1 | 9/2011 | Ganapathy et al. | |
| 2011/0276619 A1 | 11/2011 | Khan et al. | |
| 2012/0003933 A1 | 1/2012 | Baker et al. | |
| 2012/0296982 A1 | 11/2012 | Heyman et al. | |
| 2012/0296986 A1 | 11/2012 | Hassan | |
| 2013/0007499 A1 | 1/2013 | Moy | |
| 2013/0212212 A1 | 8/2013 | Addepalli et al. | |
| 2013/0332846 A1 | 12/2013 | Freedman | |
| 2014/0051439 A1 | 2/2014 | Brownworth | |
| 2014/0078949 A1* | 3/2014 | Chu | H04W 52/0209 370/311 |
| 2014/0112323 A1* | 4/2014 | Qi | H04W 48/10 370/338 |
| 2015/0103756 A1* | 4/2015 | Sinha | H04B 7/0491 370/329 |
| 2015/0312858 A1 | 10/2015 | Kerai | |
| 2015/0350355 A1 | 12/2015 | Linn et al. | |
| 2015/0350356 A1 | 12/2015 | Linn et al. | |
| 2015/0350814 A1 | 12/2015 | Krochmal et al. | |
| 2015/0350865 A1 | 12/2015 | Conn et al. | |
| 2015/0351038 A1 | 12/2015 | Dooley et al. | |
| 2015/0373084 A1 | 12/2015 | Krochmal et al. | |
| 2016/0029153 A1 | 1/2016 | Linn et al. | |

\* cited by examiner

OPERATING-MODE TRANSITIONS BASED ON ADVERTISING INFORMATION

CROSS-REFERENCE TO RELATED APPLICATION

This application claims priority under 35 U.S.C. §119(e) to U.S. Provisional Application Ser. No. 62/005,755, entitled "Operating-Mode Transitions Based on Advertising Information," by Craig P. Dooley, Akshay Mangalam Srivatsa, Anjali S. Sandesara, and Michael J. Giles, filed on May 30, 2014, the contents of which are herein incorporated by reference.

This application is related to U.S. Non-provisional application Ser. No. 14/474,466, entitled "Predefined Wireless Pairing," by Jason C. Conn, Akshay Mangalam Srivatsa, Craig P. Dooley, and Michael Giles, filed on Sep. 2, 2014; to U.S. Provisional Application Ser. No. 62/005,781, entitled "Activity Continuation Between Electronic Devices," by Christopher S. Linn, Keith Stattenfield, Christopher C. Jensen, Alexander R. Ledwith, David A. Carter, Marc J. Krochmal, John J. Iarocci, and Jonathan M. Grynspan, filed on May 30, 2014; and to U.S. Provisional Application Ser. No. 62/005,793, entitled "Companion Application for Activity Cooperation," by Marc J. Krochmal, Christopher S. Linn, John J. Iarocci, Geoffrey Stahl, and Jacques P. Gasselin de Richebourg, filed on May 30, 2014, the content of all which are herein incorporated by reference.

BACKGROUND

Field

The described embodiments relate to techniques for filtering advertisements broadcast by electronic devices in a wireless network.

Related Art

Many modern electronic devices include a networking subsystem that is used to wirelessly communicate with other electronic devices. For example, these electronic devices can include a networking subsystem with a cellular network interface (UMTS, LTE, etc.), a wireless local area network interface (e.g., a wireless network such as described in the Institute of Electrical and Electronics Engineers (IEEE) 802.11 standard or Bluetooth™ from the Bluetooth Special Interest Group of Kirkland, Wash.), and/or another type of wireless interface.

In many wireless-communication protocols, electronic devices detect each other by regularly broadcasting beacons (which is sometimes referred to as 'advertising beacons' or 'advertisements') and scanning for the beacons from other electronic devices. For example, an electronic device that communicates using a communication protocol that is compatible with Bluetooth™ may wake up its radio periodically to receive a beacon frame at beacon transmission times.

However, regularly transmitting and receiving these beacons typically results in significant power consumption by the networking subsystems. In addition, many electronic devices transition to a power-saving mode to reduce power consumption. When in the power-saving mode, an electronic device may receive an advertising beacon. During the power-saving mode, it can be difficult for the electronic device to determine whether or not to transition to the normal (higher power-consumption) operating mode to handle the advertising beacon. Therefore, the existing power-management techniques in wireless networks may reduce the operating time of the electronic device, which can degrade the user experience.

SUMMARY

The described embodiments include a receiving electronic device. This receiving electronic device includes: an antenna, and an interface circuit that communicates with a transmitting electronic device. During operation, the interface circuit receives a beacon with advertising information for the transmitting electronic device. If the advertising information is changed relative to a previous version of the advertising information for the transmitting electronic device received by the receiving electronic device, the interface circuit provides a wakeup signal to transition the receiving electronic device from a power-saving mode to a normal operating mode.

Note that the beacon may be compatible with a Bluetooth™ communication protocol.

Moreover, the advertising information may be for an application used on the transmitting electronic device, and the transmitting electronic device may be included in a predefined set of electronic devices associated with a user of the receiving electronic device.

In some embodiments, the interface circuit includes: a processor, and memory that stores a program module executed by the processor. The program module includes instructions for: receiving the beacon; determining if the advertising information is changed; and providing the wakeup signal.

Furthermore, the change in the advertising information may include an error-code change. For example, the error-code change may include a change in a cyclic redundancy check. Additionally, the transmitting electronic device may be included in the predefined set of electronic devices associated with the user of the receiving electronic device. In some embodiments, the change in the advertising information includes triggering the receiving electronic device to switch a communication protocol used for data transport.

Moreover, the change in the advertising information may include a received signal strength indication exceeding a predefined value, the advertising information may be associated with a proximity pairing request between the receiving electronic device and the transmitting electronic device.

Furthermore, the receiving electronic device may have a clamshell architecture, and the power-saving mode may be associated with the clamshell in an open position.

In some embodiments, the change in the advertising information is associated with: a change in a network address of the transmitting electronic device during discovery for a network-based service; communication of a document; and/or a change in a network address of the transmitting electronic device.

Another embodiment provides a computer-program product for use with the receiving electronic device. This computer-program product includes instructions for at least some of the operations performed by the receiving electronic device.

Another embodiment provides a method for transitioning the receiving electronic device from the power-saving mode to the normal operating mode. This method includes at least some of the operations performed by the receiving electronic device.

Another embodiment provides a system that includes the receiving electronic device and the transmitting electronic device.

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

In order to reduce the power consumption of a receiving electronic device, received advertising beacons may be filtered so that the receiving electronic device selectively transitions from a power-saving mode to a normal operating mode. For example, the receiving electronic device may receive a beacon with advertising information for a transmitting electronic device. If the advertising information is changed relative to a previous version of the advertising information for the transmitting electronic device, the receiving electronic device may transition from the power-saving mode to the normal operating mode. In this way, the receiving electronic device may 'wake up' if it receives an advertisement that it wants to act on, such as advertisements for: file sharing, wireless streaming of information, proximity pairing and/or continuity of a user experience with an application when the user transitions from the transmitting electronic device to the receiving electronic device.

For example, the wireless communication may include packets that are transmitted and received by radios in the electronic devices in accordance with a communication protocol, such as: an Institute of Electrical and Electronics Engineers (IEEE) 802.11 standard, Bluetooth™ (from the Bluetooth Special Interest Group of Kirkland, Wash.), and/or another type of wireless interface. In the discussion that follows, Bluetooth™ Low Energy (Bluetooth™ LE) is used as an illustrative example.

Figure 1:
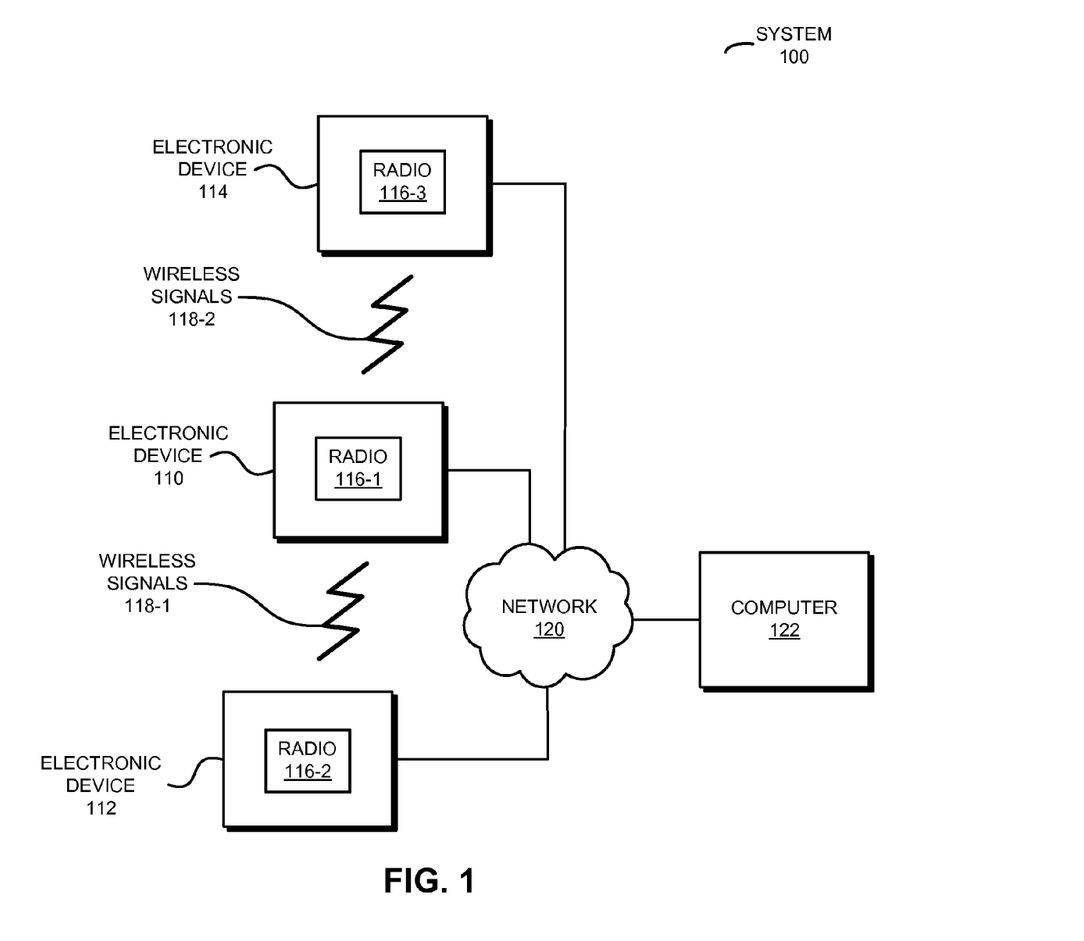
FIG. 1 is a block diagram illustrating a system in which electronic devices wirelessly communicate in accordance with an embodiment of the present disclosure.

The communication between the electronic devices is shown in FIG. 1, which presents a block diagram illustrating system 100 with wireless communication between electronic devices 110, 112 and 114. In particular, these electronic devices may wirelessly communicate while: detecting one another by scanning wireless channels, transmitting and receiving beacons or beacon frames (which are sometimes referred to as 'advertising packets') on wireless channels, establishing connections (for example, by transmitting connect requests), and/or transmitting and receiving packets (which may include the request and/or additional information as payloads). Note that electronic devices 110, 112 and 114 may be associated with a user (such as an owner of electronic devices 110, 112 and 114). This association may be specified by account information stored on computer 122, which may be accessed via network 120.

Figure 2:
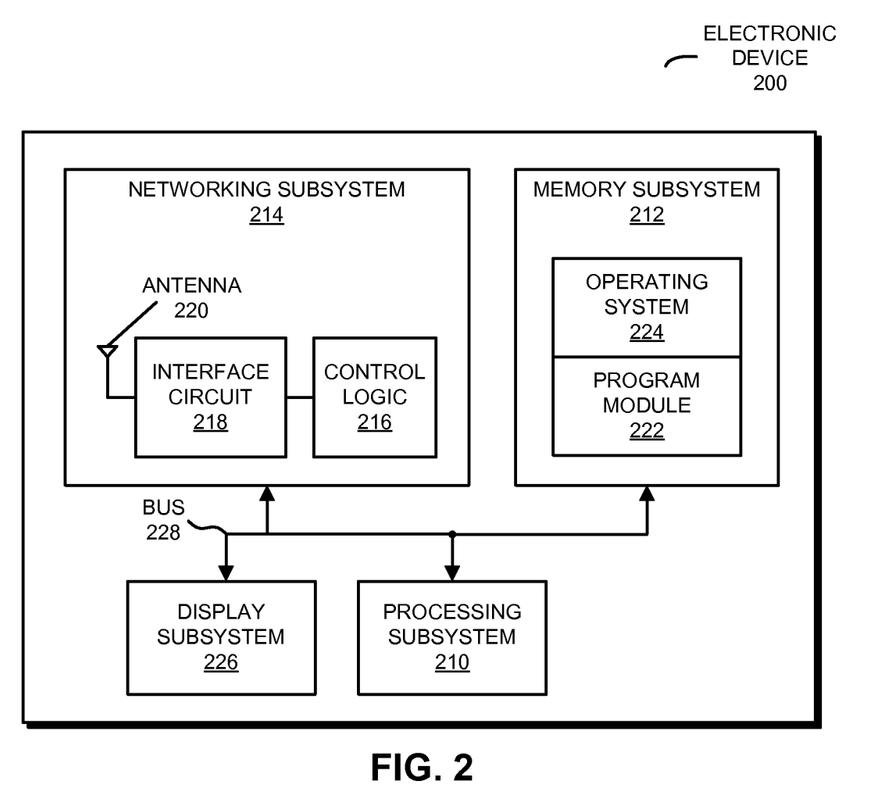
FIG. 2 is a block diagram illustrating one of the electronic devices of FIG. 1 in accordance with an embodiment of the present disclosure.

As described further below with reference to FIG. 2, electronic devices 110, 112 and 114 may include subsystems, such as a networking subsystem, a memory subsystem and a processor subsystem. In addition, electronic devices 110, 112 and 114 may include radios 116 in the networking subsystems. More generally, electronic devices 110, 112 and 114 can include (or can be included within) any electronic devices with the networking subsystems that enable electronic devices 110, 112 and 114 to wirelessly communicate with another electronic device. This can comprise transmitting beacons on wireless channels to enable electronic devices to make initial contact with or detect each other, followed by exchanging subsequent data/management frames (such as connect requests) to establish a connection, configure security options (e.g., IPSec), transmit and receive packets or frames via the connection, etc.

As can be seen in FIG. 1, wireless signals 118 (represented by jagged lines) are transmitted from radios 116-2 and 116-3 in electronic devices 112 and 114. These wireless signals 118 are received by radio 116-1 in electronic device 110. In particular, electronic devices 112 and 114 may broadcast or transmit beacons at transmit times. In turn, electronic device 110 (such as a smartphone) may receive one or more beacons, thereby detecting the presence of electronic devices 112 and/or 114, by opening scan windows during the transmit times. This may allow electronic devices 110, 112 and 114 to optionally establish a connection and communicate with each other.

However, regularly transmitting and receiving beacons may require the networking subsystems (such as interface circuits) in electronic device 110 to be in active or a high power-consumption mode more often and/or for a longer duration, which may increase the power consumption and decrease the operating time of electronic device 110. In addition, electronic device 110 may transition to a power-saving (low power-consumption) mode, and may need to determine whether or not to transition to the normal (higher power-consumption) operating mode when an advertising beacon is received.

In the power-management technique described below, electronic device 110 compares advertising information included in a received advertising beacon from electronic device 112 or 114 to previously received advertising information for these electronic devices. If the advertising information has changed, electronic device 110 may transition from the power-saving mode to the normal operating mode. Note that electronic device 110 may have a clamshell architecture, and the power-saving mode may be associated with the clamshell in an open position. Alternatively, the power-saving mode may be associated with the clamshell in a closed position (which is sometimes referred to as 'deep sleep').

For example, a user may initially use an application on electronic device 112 (which is used for purposes of illustration), such as an audio player or a web browser. Electronic device 112 may broadcast advertising information (e.g., in beacons or advertising packets) that allows electronic devices 110 and 112 (which were previously paired) to set up a Bluetooth™ LE connection (including establishing the connection and enabling encryption). The advertising information may include information associated with the application to electronic device 110, such state information for the application ('active'), as well as other information (e.g., a song title being played and a current location in the song, or a location or Uniform Resource Locator being viewed).

When the user stops using electronic device 112, the advertising information may change. Upon receiving the changed advertising information, electronic device 110 may transition to the normal operating mode (if electronic device 110 was in a power-saving mode). In some embodiments, electronic device 110 also confirms, via network 120 and computer 122, that electronic device 112 is associated with the account (e.g., that electronic device 112 is included in a list of electronic devices associated with the user) before transitioning to the normal operating mode.

In conjunction with the other information communicated from electronic device 112 to electronic device 110, transitioning to the normal operating mode may allow the user to use electronic device 110 to resume listening to the song at the current location when the user stopped listening to the song on electronic device 112. In particular, an icon may be displayed on a user interface (such as a display) in electronic device 110. If the user activates the icon (e.g., by touching a touch screen or pressing a key), electronic device 110 may play the song at the current location. This ability to seamlessly allow a user to continue using an application when switching between electronic devices 110 and 112 is sometimes referred to as 'continuity.'

Another example of a change in the advertising information occurs during so-called 'proximity pairing.' In particular, if electronic device 112 is placed proximate to electronic device 110, duplicate advertising information for electronic device 112 may be received. If the received signal strength indication (RSSI) for these beacons exceeds a predefined threshold value (such as an average of 3-5 RSSI measurements exceeding a threshold value of −50 dBm), electronic device 110 may not ignore the duplicate beacons, and/or electronic device 110 may transition to the normal operating mode (e.g., electronic device 110 may interpret the beacons as a proximity pairing request). Thus, the change in the advertising information may include the RSSI exceeding the predefined threshold value. Moreover, by not ignoring the duplicate beacons and transitioning to the normal operating mode, electronic devices 110 and 112 may be paired, such as a wireless keyboard or a wireless mouse that is paired with electronic device 110.

In another example, the change in the advertising information may include an error-code change. For example, the error-code change may include a change in a cyclic redundancy check. This may occur when electronic device 112 wants to share a file with electronic device 110 (and, more generally, during data transport between electronic devices 112 and 110). Thus, in response to a change in a cyclic redundancy check, duplicate beacons may be processed by electronic device 110, and/or electronic device 110 may transition to the normal operating mode. In some embodiments, the change in the advertising information includes triggering electronic device 110 to switch a communication protocol used for the data transport (e.g., the communication protocol may be switched after device discovery).

The error-code change may also occur when electronic device 112 wants to wirelessly stream information to electronic device 110 (such as when a network address of electronic device 112 changes). Once again, in response duplicate beacons may be processed by electronic device 110, and/or electronic device 110 may transition to the normal operating mode. In another example, the error-code change may be associated with a change in a network address of electronic device 112, such as during discovery for a network-based service. For example, electronic device 112 may be a printer that is discovered via Bluetooth™ LE.

In these ways, electronic device 110 may 'wake up' (i.e., transition to the normal operating mode) if it receives changed advertising information that it wants to act on, such as advertising information for: file sharing, wireless streaming of information, proximity pairing and/or continuity of a user experience with the application when the user transitions from electronic device 112 to electronic device 110.

In the described embodiments, processing a packet or frame in either of electronic devices 110 and 112 includes: receiving wireless signals 118 with the packet or frame; decoding/extracting the packet or frame from received wireless signals 118 to acquire the packet or frame; and processing the packet or frame to determine information contained in the packet or frame.

Although we describe the network environment shown in FIG. 1 as an example, in alternative embodiments, different numbers or types of electronic devices may be present. For example, some embodiments comprise more or fewer electronic devices. As another example, in another embodiment, different electronic devices are transmitting and/or receiving packets or frames.

We now describe embodiments of an electronic device. FIG. 2 presents a block diagram illustrating an electronic device 200, such as one of electronic devices 110, 112 and 114 in FIG. 1. This electronic device includes processing subsystem 210, memory subsystem 212, and networking subsystem 214. Processing subsystem 210 includes one or more devices configured to perform computational operations. For example, processing subsystem 210 can include one or more microprocessors, application-specific integrated circuits (ASICs), microcontrollers, programmable-logic devices, and/or one or more digital signal processors (DSPs).

Memory subsystem 212 includes one or more devices for storing data and/or instructions for processing subsystem 210 and networking subsystem 214. For example, memory subsystem 212 can include dynamic random access memory (DRAM), static random access memory (SRAM), and/or other types of memory. In some embodiments, instructions for processing subsystem 210 in memory subsystem 212 include: one or more program modules or sets of instructions (such as program module 222 or operating system 224), which may be executed by processing subsystem 210. Note that the one or more computer programs may constitute a computer-program mechanism. Moreover, instructions in the various modules in memory subsystem 212 may be implemented in: a high-level procedural language, an object-oriented programming language, and/or in an assembly or machine language. Furthermore, the programming language may be compiled or interpreted, e.g., configurable or configured (which may be used interchangeably in this discussion), to be executed by processing subsystem 210.

In addition, memory subsystem 212 can include mechanisms for controlling access to the memory. In some embodiments, memory subsystem 212 includes a memory hierarchy that comprises one or more caches coupled to a memory in electronic device 200. In some of these embodiments, one or more of the caches is located in processing subsystem 210.

In some embodiments, memory subsystem 212 is coupled to one or more high-capacity mass-storage devices (not shown). For example, memory subsystem 212 can be coupled to a magnetic or optical drive, a solid-state drive, or another type of mass-storage device. In these embodiments, memory subsystem 212 can be used by electronic device 200 as fast-access storage for often-used data, while the mass-storage device is used to store less frequently used data.

Networking subsystem 214 includes one or more devices configured to couple to and communicate on a wired and/or wireless network (i.e., to perform network operations), including: control logic 216, an interface circuit 218 and an antenna 220. For example, networking subsystem 214 can include a Bluetooth™ networking system, a cellular networking system (e.g., a 3G/4G network such as UMTS, LTE, etc.), a universal serial bus (USB) networking system, a networking system based on the standards described in IEEE 802.11 (e.g., a Wi-Fi networking system), an Ethernet networking system, and/or another networking system.

Networking subsystem 214 includes processors, controllers, radios/antennas, sockets/plugs, and/or other devices used for coupling to, communicating on, and handling data and events for each supported networking system. Note that mechanisms used for coupling to, communicating on, and handling data and events on the network for each network system are sometimes collectively referred to as a 'network interface' for the network system. Moreover, in some embodiments a 'network' between the electronic devices does not yet exist. Therefore, electronic device 200 may use the mechanisms in networking subsystem 214 for performing simple wireless communication between the electronic devices, e.g., transmitting advertising or beacon frames and/or scanning for advertising frames transmitted by other electronic devices as described previously.

Within electronic device 200, processing subsystem 210, memory subsystem 212, and networking subsystem 214 are coupled together using bus 228. Bus 228 may include an electrical, optical, and/or electro-optical connection that the subsystems can use to communicate commands and data among one another. Although only one bus 228 is shown for clarity, different embodiments can include a different number or configuration of electrical, optical, and/or electro-optical connections between the subsystems.

In some embodiments, electronic device 200 includes a display subsystem 226 for displaying information on a display, which may include a display driver and the display, such as a liquid-crystal display, a multi-touch touchscreen, etc.

Electronic device 200 can be (or can be included in) any electronic device with at least one network interface. For example, electronic device 200 can be (or can be included in): a desktop computer, a laptop computer, a server, a media player (such as an MP3 player), an appliance, a subnotebook/netbook, a tablet computer, a smartphone, a cellular telephone, a piece of testing equipment, a network appliance, a set-top box, a peripheral device, a personal digital assistant (PDA), a toy, a controller, a digital signal processor, a game console, a computational engine within an appliance, a consumer-electronic device, a portable computing device, a personal organizer, a sensor, a user-interface device and/or another electronic device. In an exemplary embodiment, electronic device 200 is a laptop computer.

Although specific components are used to describe electronic device 200, in alternative embodiments, different components and/or subsystems may be present in electronic device 200. For example, electronic device 200 may include one or more additional processing subsystems 210, memory subsystems 212, networking subsystems 214, and/or display subsystems 226. Additionally, one or more of the subsystems may not be present in electronic device 200. Moreover, in some embodiments, electronic device 200 may include one or more additional subsystems that are not shown in FIG. 2. For example, electronic device 200 can include, but is not limited to, a data collection subsystem, an audio and/or video subsystem, an alarm subsystem, a media processing subsystem, and/or an input/output (I/O) subsystem. Also, although separate subsystems are shown in FIG. 2, in some embodiments, some or all of a given subsystem or component can be integrated into one or more of the other subsystems or component(s) in electronic device 200. For example, in some embodiments program module 222 is included in operating system 224.

Moreover, the circuits and components in electronic device 200 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

An integrated circuit may implement some or all of the functionality of networking subsystem 214, such as a radio. Moreover, the integrated circuit may include hardware and/or software mechanisms that are used for transmitting wireless signals from electronic device 200 and receiving signals at electronic device 200 from other electronic devices. Aside from the mechanisms herein described, radios are generally known in the art and hence are not described in detail. In general, networking subsystem 214 and/or the integrated circuit can include any number of radios. Note that the radios in multiple-radio embodiments function in a similar way to the described single-radio embodiments.

In some embodiments, networking subsystem 214 and/or the integrated circuit include a configuration mechanism (such as one or more hardware and/or software mechanisms) that configures the radio(s) to transmit and/or receive on a given communication channel (e.g., a given carrier frequency). For example, in some embodiments, the configuration mechanism can be used to switch the radio from monitoring and/or transmitting on a given communication channel to monitoring and/or transmitting on a different communication channel. (Note that 'monitoring' as used herein comprises receiving signals from other electronic devices and possibly performing one or more processing operations on the received signals, e.g., determining if the received signal comprises an advertising frame, etc.)

While a communication protocol compatible with the Bluetooth™ standard was used as an illustrative example, the described embodiments of the communication techniques may be used in a variety of network interfaces. Furthermore, while some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both. For example, at least some of the operations in the power-management technique may be implemented using networking subsystem 214 (such as in physical layer hardware in interface circuit 218). Alternatively or additionally, at least some of the operations in the paring technique may be implemented using: program module 222, operating system 224 (such as a driver for interface circuit 218) and/or in firmware in interface circuit 218. Thus, a driver for a processor in interface 218 may include instructions for: receiving a beacon with advertising information; determining if the advertising information is changed; and providing a wakeup signal that transitions electronic device 200 from the power-saving mode to the normal operating mode.

Figure 3:
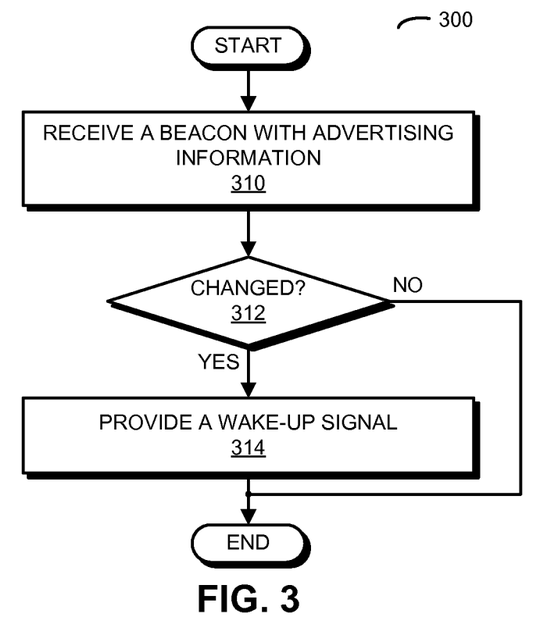
FIG. 3 is a flow diagram illustrating a method for transitioning one of the electronic devices of FIG. 1 from a power-saving mode to a normal operating mode in accordance with an embodiment of the present disclosure.

FIG. 3 presents a flow diagram illustrating a method 300 for transitioning one of the electronic devices of FIG. 1 from a power-saving mode to a normal operating mode, such as electronic device 110. During operation, the electronic device receives a beacon with advertising information (operation 310) for another electronic device, where the other electronic device is included in a predefined set of electronic devices associated with a user of the electronic device.

Then, the electronic device determines if the advertising information is changed (operation 312) relative to a previous version of the advertising information for the other electronic device received by the electronic device. If the advertising information is changed (operation 312), the electronic device provides a wakeup signal (operation 314) to transition the electronic device from the power-saving mode to the normal operating mode. Otherwise (operation 312), the electronic device remains in the power-saving mode.

Figure 4:
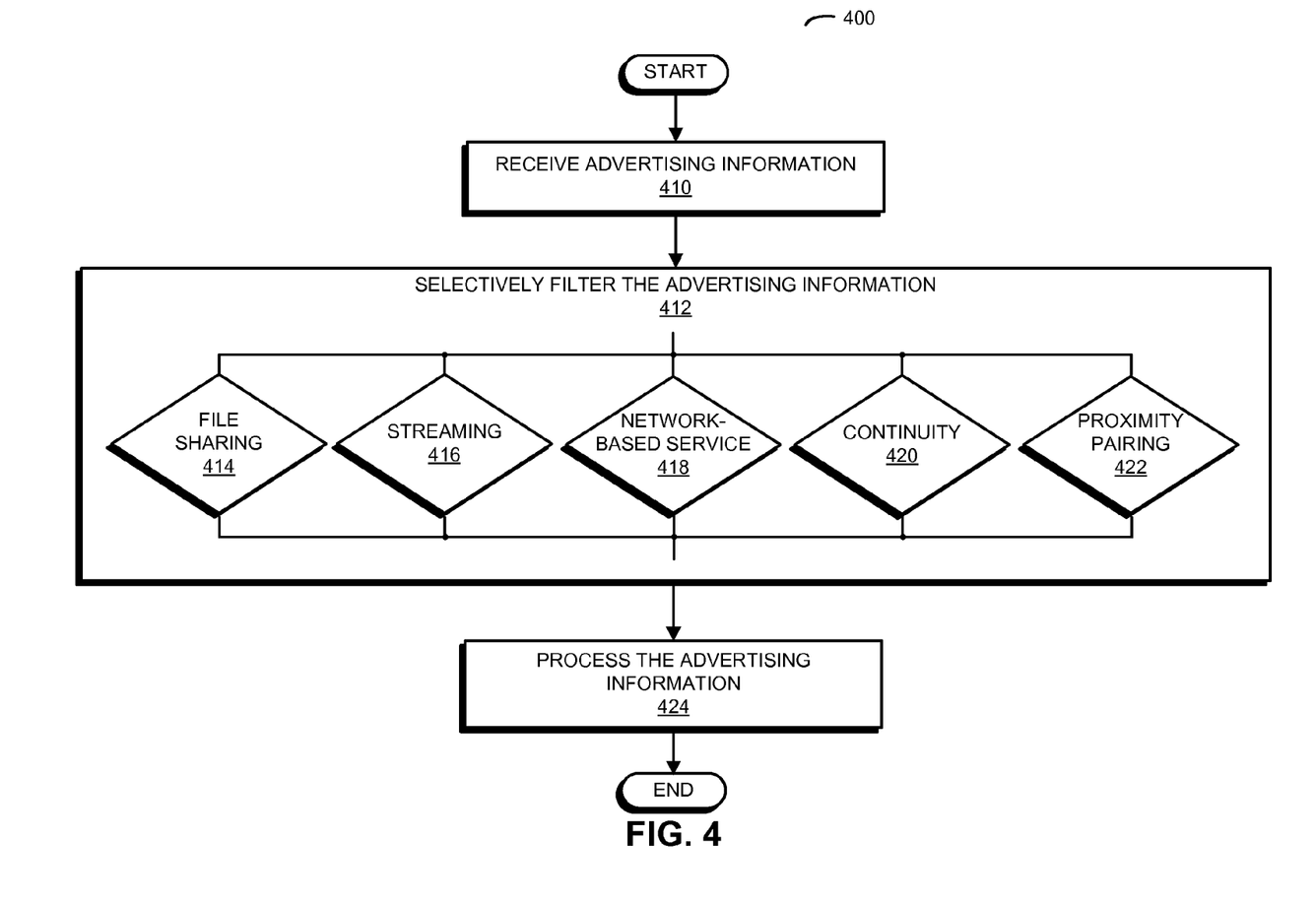
FIG. 4 is a flow diagram illustrating a method for filtering advertisements from one of the electronic devices of FIG. 1 in accordance with an embodiment of the present disclosure.

FIG. 4 presents a flow diagram illustrating a method 400 for filtering advertisements from one of the electronic devices of FIG. 1, such as electronic device 110. In particular, the advertising information included in a first advertising packet may be processed by electronic device 110 (FIG. 1), but the advertising information received (operation 410) in subsequent advertising packets from electronic device 112 (FIG. 1) may be selectively filtered (operation 412). For file sharing (operation 414), wireless streaming (operation 416) of information, and during discovery for a network-based service (operation 418), the selective filtering may filter out the advertising information (i.e., it may not be processed by processing subsystem 210 in FIG. 2) unless a cyclic redundancy check has changed. In an exemplary embodiment, the cyclic redundancy check involves 24 bits or 3 bytes, which may reduce the memory used to store the cyclic redundancy check relative to other techniques.

Similarly, the advertising information associated with continuity (operation 420) may be filtered out unless a cyclic redundancy check has changed and electronic device 112 (FIG. 1) is included in the list of electronic devices associated with the account (and, thus, the user). Furthermore, advertising information associated proximity pairing (operation 422) may be filtered out unless the RSSI is greater than a threshold value. The advertising information that is not filtered out may be processed (operation 424) using processing subsystem 210 in FIG. 2.

In some embodiments of methods 300 (FIG. 3) and 400, there may be additional or fewer operations. For example, the content in the advertising packets (i.e., the advertising information) may be defined so that, when received, the electronic device transitions to the normal operating mode. Moreover, the order of the operations may be changed, and/or two or more operations may be combined into a single operation.

In these ways, the electronic devices (for example, interface circuits, drivers and/or program modules in the electronic devices) may facilitate communication between the electronic devices with reduced power consumption and reduced latency. In particular, by selectively filtering the advertising packets, the power-management technique may ensure that the electronic devices only transition to the normal operating mode as needed.

Figure 5:
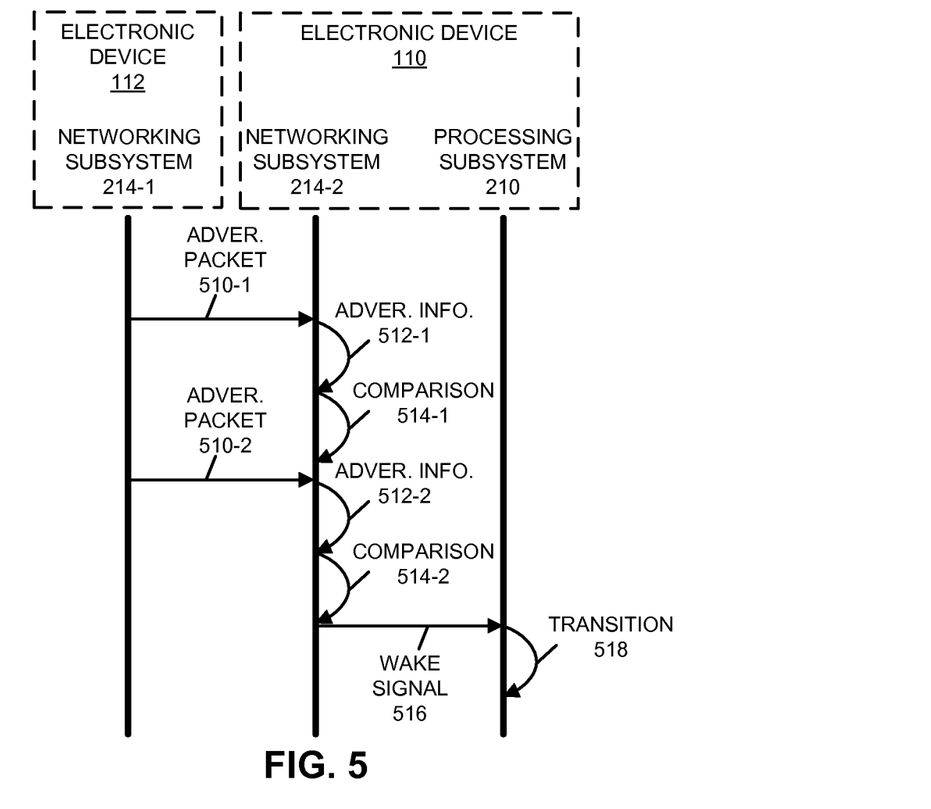
FIG. 5 is a drawing illustrating communication between the electronic devices of FIG. 1 in accordance with an embodiment of the present disclosure.

FIG. 5 presents a drawing illustrating communication between electronic devices 110 and 112. In particular, networking subsystem 214-1 in electronic device 112 may transmit advertising packets 510 to electronic device 110. These advertising packets may be received by networking subsystem 214-2 in electronic device 110. Then, networking subsystem 214-2 may extract advertising information 512 that was included in advertising packets 510 to processing subsystem 210. Next, networking subsystem 214-2 in electronic device 110 may compare 514 the advertising information in a given one of advertising packets 510 with previously received advertising information. If the advertising information has changed, networking subsystem 214-2 may provide a wake signal 516 or wake command to processing subsystem 210, which transitions 518 electronic device 110 from the power-saving mode to the normal operating mode.

While the preceding embodiments illustrated the power-management technique with electronic devices associated with an account of a user, in other embodiments the power-management technique may be used to selectively filter advertising packets communicated between electronic devices associated with different accounts and/or different users. For example, the selective filtering may occur if account identifiers for the different accounts (and, more generally, authorization from the users) are available.

In the preceding description, we refer to 'some embodiments.' Note that 'some embodiments' describes a subset of all of the possible embodiments, but does not always specify the same subset of embodiments.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. A receiving electronic device, comprising:
an antenna; and
an interface circuit, electrically coupled to the antenna, configured to communicate with a transmitting electronic device, wherein the interface circuit is further configured to:
  receive a beacon with advertising information for the transmitting electronic device;
  filter the advertising information;
  determine that the filtered advertising information has changed relative to a previous version of the advertising information for the transmitting electronic device received by the receiving electronic device; and
  in response to determining that the filtered advertising information has changed relative to the previous version of the advertising information, provide a wakeup signal to transition the receiving electronic device from a power-saving mode to a normal operating mode.

2. The receiving electronic device of claim 1, wherein the beacon is compatible with a Bluetooth communication protocol.

3. The receiving electronic device of claim 1, wherein the filtered advertising information is for an application used on the transmitting electronic device; and
wherein the transmitting electronic device is included in a predefined set of electronic devices associated with a user of the receiving electronic device.

4. The receiving electronic device of claim 1, wherein the interface circuit further comprises:
a processor; and
memory, coupled to the processor, which stores a program module configured to be executed by the processor, the program module including:
instructions for receiving the beacon;
instructions for determining if the filtered advertising information is changed; and
instructions for providing the wakeup signal.

5. The receiving electronic device of claim 1, wherein the change in the filtered advertising information includes an error-code change.

6. The receiving electronic device of claim 1, wherein the transmitting electronic device is included in a predefined set of electronic devices associated with a user of the receiving electronic device.

7. The receiving electronic device of claim 5, wherein the error-code change includes a change in a cyclic redundancy check.

8. The receiving electronic device of claim 1, wherein the change in the filtered advertising information includes triggering the receiving electronic device to switch a communication protocol used for data transport.

9. The receiving electronic device of claim 1, wherein the change in the filtered advertising information includes a received signal strength indication exceeding a predefined value; and
wherein the filtered advertising information is associated with a proximity pairing request between the receiving electronic device and the transmitting electronic device.

10. The receiving electronic device of claim 1, wherein the receiving electronic device has a clamshell architecture; and
wherein the power-saving mode is associated with the clamshell in an open position.

11. The receiving electronic device of claim 1, wherein the change in the filtered advertising information is associated with one of: a change in a network address of the transmitting electronic device during discovery for a network-based service, communication of a document, and a change in a network address of the transmitting electronic device.

12. A computer-program product for use in conjunction with a receiving electronic device, the computer-program product comprising a non-transitory computer-readable storage medium and a computer-program mechanism embedded therein, to transition the receiving electronic device from a power-saving mode to a normal operating mode, the computer-program mechanism including:
instructions for receiving a beacon with advertising information for a transmitting electronic device;
instructions for filtering the advertising information; and
instructions for providing a wakeup signal to transition the receiving electronic device from the power-saving mode to the normal operating mode in response to determining that the filtered advertising information has changed relative to a previous version of the advertising information for the transmitting electronic device received by the receiving electronic device.

13. The computer-program product of claim 12, wherein the filtered advertising information is for an application used on the transmitting electronic device; and
wherein the transmitting electronic device is included in a predefined set of electronic devices associated with a user of the receiving electronic device.

14. The computer-program product of claim 12, wherein the change in the filtered advertising information includes an error-code change.

15. The computer-program product of claim 14, wherein the transmitting electronic device is included in a predefined set of electronic devices associated with a user of the receiving electronic device.

16. The computer-program product of claim 12, wherein the change in the filtered advertising information includes a received signal strength indication exceeding a predefined value; and
wherein the filtered advertising information is associated with a proximity pairing request between the receiving electronic device and the transmitting electronic device.

17. A method for transitioning a receiving electronic device from a power-saving mode to a normal operating mode, wherein the method comprises:
receiving a beacon with advertising information for an application used on a transmitting electronic device, wherein the transmitting electronic device is included in a predefined set of electronic devices associated with a user of the receiving electronic device;
filtering the advertising information;
determining that the filtered advertising information has changed relative to a previous version of the advertising information for the transmitting electronic device received by the receiving electronic device; and
in response to determining that the filtered advertising information has changed relative to the previous version of the advertising information, providing a wakeup signal to transition the receiving electronic device from the power-saving mode to the normal operating mode.

18. The method of claim 17, wherein the change in the filtered advertising information includes an error-code change.

19. The method of claim 18, wherein the error-code change includes a change in a cyclic redundancy check.

20. The method of claim 17, wherein the beacon is compatible with a Bluetooth communication protocol.

* * * * *

UNITED STATES PATENT AND TRADEMARK OFFICE
CERTIFICATE OF CORRECTION

PATENT NO. : 9,549,375 B2  
APPLICATION NO. : 14/475329  
DATED : January 17, 2017  
INVENTOR(S) : Dooley et al.

Page 1 of 1

It is certified that error appears in the above-identified patent and that said Letters Patent is hereby corrected as shown below:

On the Title Page

In Item (56), Foreign Patent Documents, "WO2015/183403 A1 11/2005" should read --WO2015/183403 A1 12/2015--.

Signed and Sealed this
Tenth Day of April, 2018

Andrei Iancu
*Director of the United States Patent and Trademark Office*